(12) United States Patent
Yak et al.

(10) Patent No.: US 6,901,037 B2
(45) Date of Patent: May 31, 2005

(54) DEVICE FOR RECORDING AND/OR REPRODUCING AN OPTICAL RECORD CARRIER

(75) Inventors: Aik Seng Yak, Singapore (SG); Wooi Liang Chin, Singapore (SG); Canniputhur Santhana Krishnan Sanjay Krishnan, Chennai (IN)

(73) Assignee: Koninklijke Philips Electronics N.V., Eindhoven (NL)

( * ) Notice: Subject to any disclaimer, the term of this patent is extended or adjusted under 35 U.S.C. 154(b) by 650 days.

(21) Appl. No.: 09/885,701

(22) Filed: Jun. 20, 2001

(65) Prior Publication Data

US 2002/0034135 A1 Mar. 21, 2002

(30) Foreign Application Priority Data

Jun. 23, 2000 (WO) ............................... PCT/SG00/00088

(51) Int. Cl.[7] ................................................ G11B 7/00
(52) U.S. Cl. ................................ 369/44.37; 369/44.29; 369/44.35
(58) Field of Search ........................... 369/44.37, 44.11, 369/44.14, 44.25, 44.26, 44.29, 44.35, 44.41

(56) References Cited

U.S. PATENT DOCUMENTS

| | | | | |
|---|---|---|---|---|
| 4,660,191 A | | 4/1987 | Maeda et al. .................. 369/46 |
| 5,121,375 A | * | 6/1992 | Kuribayashi .............. 369/44.37 |
| 5,341,353 A | * | 8/1994 | Yoshio et al. ............. 369/44.28 |
| 6,091,685 A | * | 7/2000 | Kim ......................... 369/47.51 |
| 6,320,831 B1 | * | 11/2001 | Inoue et al. .............. 369/47.22 |
| 6,345,020 B1 | * | 2/2002 | Cho et al. ................. 369/44.32 |
| 6,366,543 B2 | * | 4/2002 | Uemura et al. ........... 369/44.29 |
| 6,504,799 B1 | * | 1/2003 | Yamashita et al. ........ 369/44.11 |
| 6,594,210 B2 | * | 7/2003 | Kumagai .................. 369/47.17 |
| 6,721,242 B2 | * | 4/2004 | Ohnishi et al. ........... 369/44.26 |

* cited by examiner

*Primary Examiner*—Paul W. Huber
*Assistant Examiner*—Bach Q. Vuong
(74) *Attorney, Agent, or Firm*—Michael E. Belk

(57) ABSTRACT

A device for recording and/or reproducing an optical record carrier (1), comprises an optical system for projecting a first, a second and a third optical beam at a first (11), a second (12) and a third spot (13) at the record carrier (1). The device further comprises detection elements primary position signals (D5, C, D1) which is indicative for an amount of radiation reflected by the record carrier at said thoses spots (11). The device further comprises signal processing means (34.1, . . . 34.4; 35.1, . . . 35.4) for generating a plurality of secondary position signals (S1, S2, S3, S4) in response to the primary position signals (D5, C, D1). A selection element (36) selects one of the position signals (S1, S2, D1, S3, S4) as an output signal (WRE) in response to a selection signal (SEL). The selection signal (SEL) is derived from the output signal (WRE) of the selection element (36).

20 Claims, 2 Drawing Sheets

DEVICE FOR RECORDING AND/OR REPRODUCING AN OPTICAL RECORD CARRIER

Device for recording and/or reproducing an optical record carrier.

The invention pertains to a device for recording and/or reproducing an optical record carrier, comprising:

an optical system for projecting a first, a second and a third optical beam at a first, a second and a third spot at the record carrier, a first detection element for generating a first primary position signal which is indicative for an amount of radiation reflected by the record carrier at said first spot, a second detection element for generating a second primary position signal which is indicative for an amount of radiation reflected by the record carrier at said second spot, a third detection element for generating a third primary position signal which is indicative for an amount of radiation reflected by the record carrier at said third spot, signal processing means for generating a plurality of secondary position signals in response to the primary position signals, a selection element for selecting one of the position signals as an output signal in response to a selection signal.

Such a device is known from U.S. Pat. No. 4,660,191. The known device comprises a multiplier for multiplying the second position signal with a multiplication factor. A first differential amplifier subtracts the output of the multiplier from the first position signal. A second differential amplifier subtracts the third position signal from the output of the multiplier. A selection element selects the output signal of the first differential amplifier as the radial error signal if the magnitude of the first position signal is less than the magnitude of the third position signal. The selection element selects the output signal of the second differential amplifier as the radial error signal if the magnitude of the first position signal is greater than the magnitude of the third position signal. This arrangement provides for an output signal which is a monotonous function of the position in a first range from half a track before the target track until half a track beyond the target track. The output signal is linear in a second range from a a quarter of a track at both sides of the target track.

It is a purpose of the invention to provide a device having a substantially increased first and second range. According to the invention the device is characterized in that the selection signal is derived from the output signal of the selection element. The output signal representing the radial error signal is constructed by selecting substantially linear segments of the position signals. The substantially linear segments are merged into a continuous function. As the selection signal is derived from the output signal of the multiplexer it is possible to substantially enlarge the first and the second range as is described below.

In a preferred embodiment at least one further position signal is obtained by adding a constant value to a position signal. This is a very efficient way to merge the substantially linear segments into a continuous function.

The selection signal may be derived from the output signal of the selection element in several ways. Preferably a lookup table is used as this enables a fast computation of the selection signal.

These and other aspects of the invention are described in more detail with reference to the drawing. Therein FIG. 1 schematically shows an embodiment of a device according to the invention, FIG. 2 shows in more detail a part of the device of FIG. 1, FIG. 3 shows some signals occurring in the embodiment of FIGS. 1 and 2.

Figure 1:
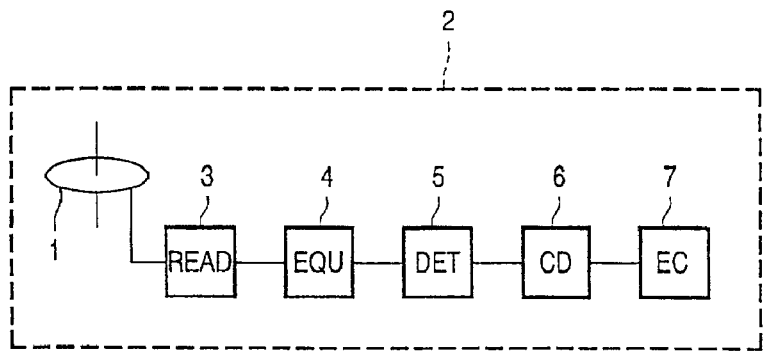

FIG. 1 shows a device 2 for recording and/or reproducing an optical record carrier 1. The device 2 comprises a read unit 3 for detecting an optical pattern at the record carrier and generating an electrical read signal in response thereto. The read signal is equalized by an equalizer 4, in order to optimize the read signal for detection. A detector 5 generates a binary signal out of the optimized read signal. The binary signal is demodulated by a channel decoder 6. Next the output signal is obtained from the demodulated signal by an error detecting and correcting unit 7. The signal stored at the record carrier is for example protected by CIRC-encoding and subsequently modulated by a channel code as EFM.

Figure 2:
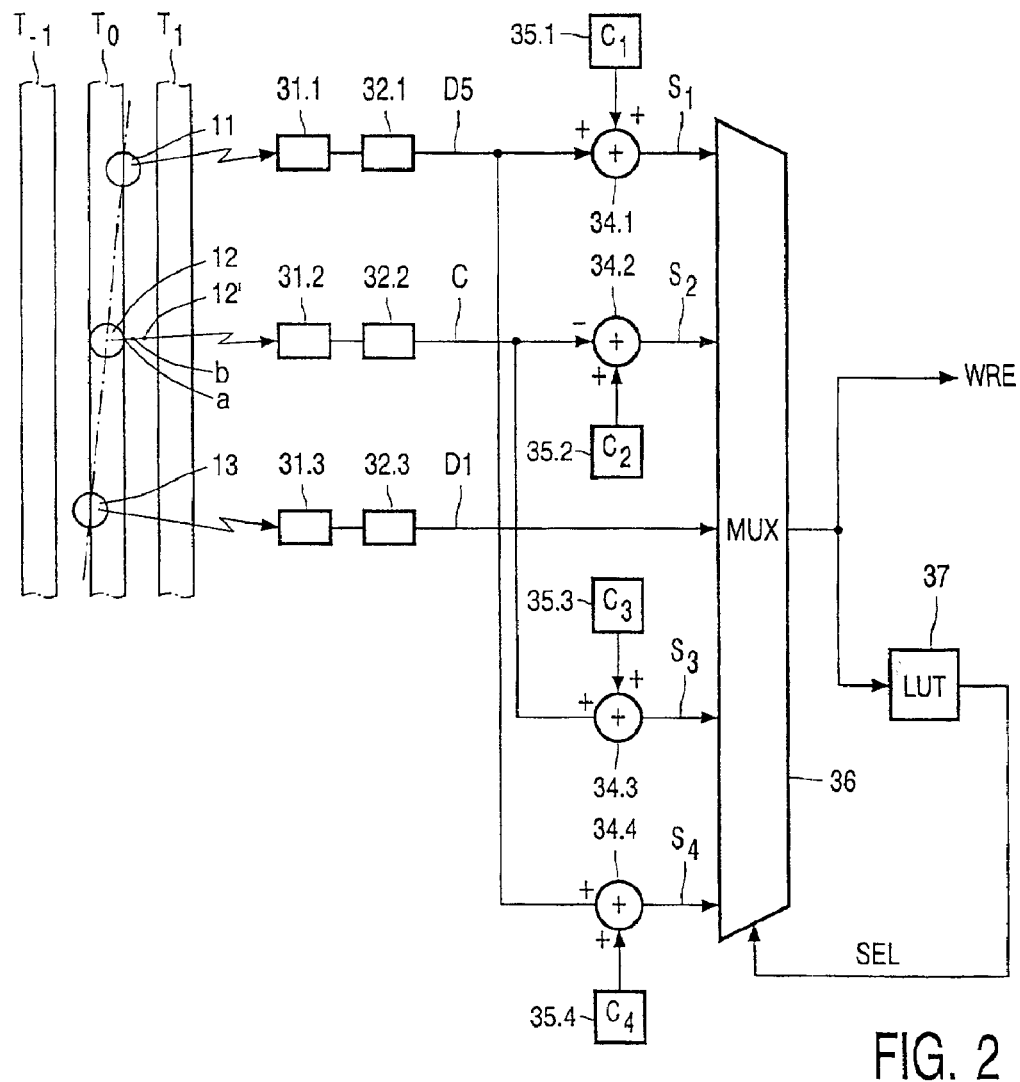

A part of the read unit is shown in more detail in FIG. 2. The read unit 3 comprises a projecting unit for projecting a first, a second and a third optical beam at a first 11, a second 12 and a third spot 13 at the record carrier 1. The record carrier 1 has tracks of which a target track T0, a preceeding track T-1 and a succeeding track T1 are shown in FIG. 2. As it is well known as such how to generate the three beams, and as this is not relevant for the present invention the projecting unit is not shown here. The read unit comprises first detection means 31.1, for generating a first primary position signal D5 which is indicative for an amount of radiation reflected by the record carrier 1 at said first spot 11. The read means comprises second detection means 31.2 for generating a second primary position signal C which is indicative for an amount of radiation reflected by the record carrier 1 at said second spot 12. The read unit 3 further comprises third detection means 31.3 for generating a third primary position signal D1 which is indicative for an amount of radiation reflected by the record carrier 1 at said third spot 13. The read unit 3 comprises A/D converters for converting the signals generated by the detection means 31.1, 31.2, 31.3 into a digital format.

Figure 3:
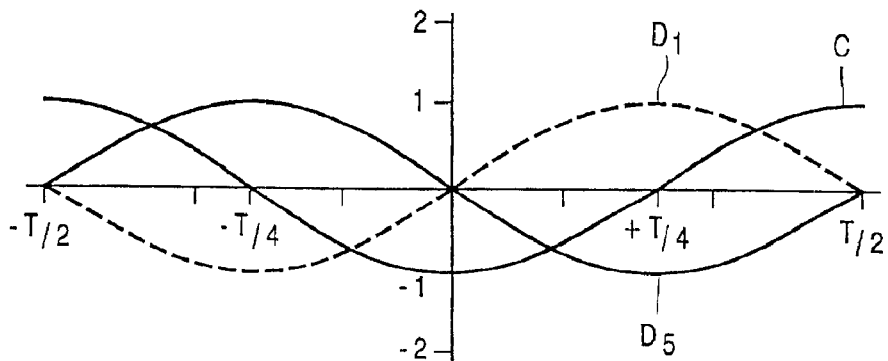

The signals D1, C and D5 are shown as a function of the position with respect to the target track T0 in FIG. 3.

The read unit 3 comprises signal processing means 34.1, 34.2, 34.3, 34.4, 35.1, 35.2, 35.3, 35.4 for generating secondary position signals S1, S2, S3, S4 in response to the primary position signals. In the embodiment shown the secondary position signals relate to the primary position signals D5, C and D1 as follows:

$$S1 = D5 + C1,$$

$$S2 = -C + C2,$$

$$S3 = C + C3,$$

$$S4 = D5 + C4.$$

The proper values for the constants C1, . . . , C4 depend on the amplitudes of the signals D5, C and D1. Preferably these signals should have a mutually equal amplitude in order to achieve that the signal WRE is a substantially linear function of the position with respect to the target track. If the signals D5, C and D1 have an amplitude equal to 1 the said constants preferably have the values:

$$C1 = -2\sqrt{2},\ C2 = -\sqrt{2},\ C3 = +\sqrt{2},\ C4 = +2\sqrt{2}$$

A selection element formed by a multiplexer 36 selects one of the position signals S1, S2, D1, S3, S4 as an output signal WRE in response to a selection signal SEL.

The selection signal SEL is derived from the output signal WRE of the selection element 36. In the embodiment shown the selection signal SEL is generated from the output signal WRE by means of a look-up table 37. The output value SEL of the lookup table as a function of the value of the signal WRE at its input is shown in the following table. Therein it is also shown which of the position signals S1, S2, D1, S3, S4 is selected by the multiplexer.

| Range | SEL | WRE |
|---|---|---|
| $WRE \leq -\frac{3}{2}\sqrt{2}$ | 1 | S1 |
| $-\frac{3}{2}\sqrt{2} < WRE \leq -\frac{1}{2}\sqrt{2}$ | 2 | S2 |
| $-\frac{1}{2}\sqrt{2} < WRE \leq +\frac{1}{2}\sqrt{2}$ | 3 | D1 |
| $+\frac{1}{2}\sqrt{2} < WRE \leq +\frac{3}{2}\sqrt{2}$ | 4 | S3 |
| $WRE > +\frac{3}{2}\sqrt{2}$ | 5 | S4 |

Figure 4:
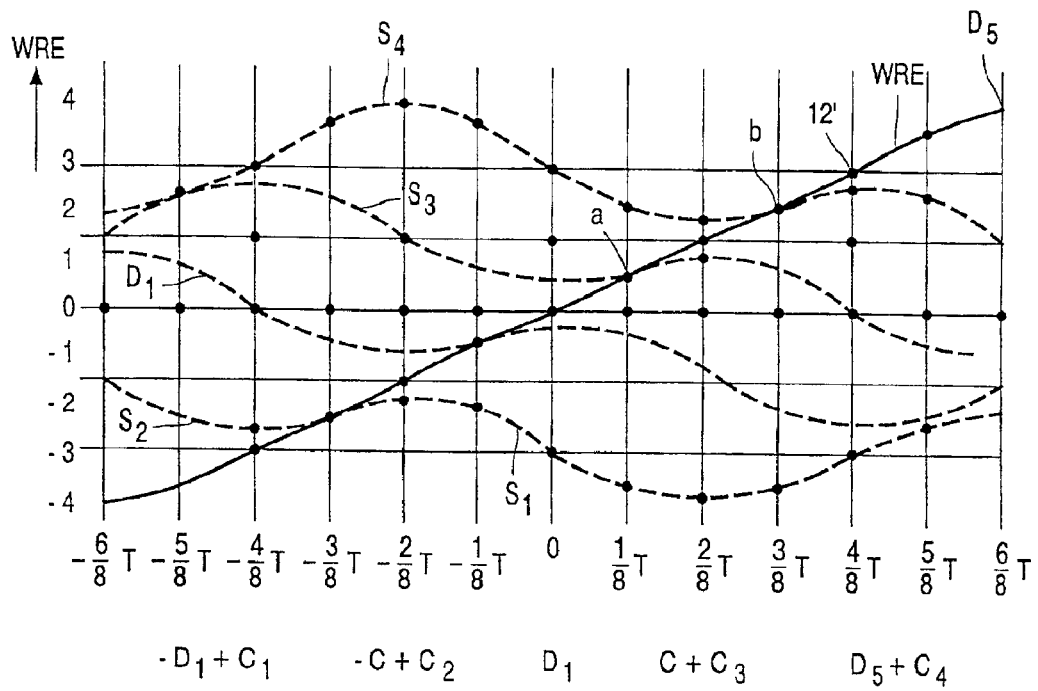
FIG. 4 shows further signals occurring in the embodiment of FIGS. 1 and 2.
Figure 5:
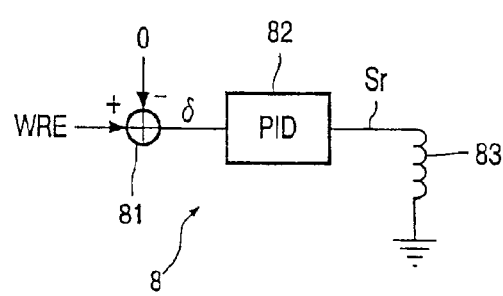
FIG. 5 shows in more detail another part of the device of FIG. 1.

FIG. 4 shows in dashed lines the five position signals S1, S2, D1, S3 and S4, and in a solid line the outputsignal WRE provided by the multiplexer 36. The device according to the invention has a radial servo system 8 which uses the signal WRE to position the central spot 12 at the target track T0. The servo system 8 is shown schematically in FIG. 5. The servo system 8 has a comparator for comparing the radial error signal WRE with a reference value, in this case 0. The resulting difference signal δ serves as a control signal for a control unit 82 which provides a control signal Sr to an actuator which is mechanically coupled to an optical element (not shown) which influences the position of the three beams and therewith the position of the spots 11, 12, 13 at the record carrier 1. The optical element is for example a movable mirror or a lens.

The device according to the invention operates as follows: If the central beam is positioned within a range of −T/8 to +T/8 from the target track, then the signal D1 is selected as the radial error signal WRE. This signal is a substantially linear function of the deviation of the central spot 12 with respect to the target track T0. The servo mechanism 8 using the radial error signal WRE tends to reduce the radial error WRE to 0 and therewith reposition the central beam 12 at the target track T0.

By way of example it is supposed that a mechanical shock has the effect that the central spot 12 is displaced with respect to the target track T0, for example, to position 12', which is at a distance T/2 of the target track T0. During this displacement the central spot will pass the intermediate position a, which is at a distance of T/8 from the target track. The signal D1 then surpasses the value of $$\frac{1}{2}\sqrt{2},$$

so that the selection signal SEL=4 is generated by the lookup table 37. As a result thereof the multiplexer 36 now selects the signal S3 as the position signal WRE. The signal S3 is substantially linear within the range T/8 until 3T/8. During the said displacement of the central spot 12, the central spot 12 will also pass a further intermediate position b which is at a distance of 3T/8 of the target track. The signal S3 then surpasses the value $$\frac{3}{2}\sqrt{2}.$$

The lookup table 37 then generates a value 5 for the signal SEL. As a result the multiplexer 36 selects the signal S4 as the position signal. The latter signal is a substantially linear function of the position in the range of 3T/8 to 5T/8 and a monotonously increasing function thereof until a position 3T/4. If the displacement as a result of the mechanical shock is completed, the radial servo system will tend to reduce the radial error signal WRE to 0. During reduction of this displacement the central spot 12 will pass the intermediate position b again, now in the opposite direction. The signal WRE then decreases below a value $$\frac{3}{2}\sqrt{2}.$$

The signal SEL provided by the lookup table 37 then assumes a value 4 and the signal S3 is selected by the multiplexer 36. Subsequently the position a is passed, so that the signal WRE decreases below a value $$\frac{1}{2}\sqrt{2}.$$

The lookup table 37 then provides a signal SEL with a value 3. As a result the multiplexer 36 selects the signal D1 as the output signal WRE. The servo system 8 now reduces the error signal WRE to 0 and therewith repositions the central spot 12 at the target track T0.

It is remarked that the scope of protection of the invention is not restricted to the embodiments described herein. For example the range wherein the radial error signal is a linear function of the position may be further increased by increasing the number of position signals from which the selection element selects. Other position position signal may be used than the ones shown in the above embodiment, for example the position signal D1 may be replace by the signal −D5. The signal processing means may be in the form of dedicated hardware, but may otherwise be implemented as a programmed microprocessor, for example. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

What is claimed is:

1. Device for recording and/or reproducing an optical record carrier (1), comprising;
    an optical system for projecting a first, a second and a third optical beam at a first (11), a second (12) and a third spot (13) at the record carrier (1),
    a first detecting element (31.1) for generating a first primary position signal (D5) which is indicative for an amount of radiation reflected by the record carrier at said first spot (11),
    a second detection element (31.2) for generating a second primary position signal (C) which is indicative for an amount of radiation reflected by the record carrier at said second spot (12),
    a third detection element (31.3) for generating a third primary position signal (D1) which is indicative for an amount of radiation reflected by the record carrier at said third spot (13), signal processing means (34.1, . . . 34.4, . . . 34.4; 35.1, . . . 35.4) for generating a plurality of secondary position signals (S1, S2, S3, S4) in response to the primary position signals (D5, C, D1), a selection element (36) for selecting one of the position signals (S1, S2, D1, S3, S4) as an output signal (WRE) in response to a selection signal (SEL), characterized in that, the selection signal (SEL) is derived from the output signal (WRE) of the selection element (36).

2. Device according to claim 1, characterized in that, at least one secondary position is obtained by adding a constant value to a primary position signal.

3. Device according to claim 1, characterized by a lookuptable for deriving the selection signal (SEL) from the output signal (WRE).

4. Device according to claim 1, characterized by computation means for deriving the selection signal (SEL) from the output signal (WRE).

5. Device according to claim 4, wherein the computation means derives the selection signal as a function of the value of the output signal.

6. Device according to claim 3, wherein the lookuptable contains a plurality of ranges for values used and for deriving the selection signal from the output signal.

7. Device according to claim 6, wherein the plurality of ranges for values does not contain any overlapping values.

8. Device according to claim 7, wherein the plurality of ranges for values forms a continuous range that does not have any gaps in values.

9. Device according to claim 2, wherein the at least one secondary position is a plurality of secondary positions that are obtained by adding a corresponding one of a plurality of constant values to a plurality of the primary position signals.

10. Device according to claim 9, wherein the at least one two of the primary position signals have multiple secondary positions obtained by adding the corresponding one of the plurality of constant values.

11. Device according to claim 1, further comprising digitizing means for providing a digital version of each of the primary position signals to the signal processing means.

12. A device for recording and/or reproducing information on an optical record carrier, comprising;

an optical system for projecting a first, a second and a third optical beam at a first, a second and a third spot at the record carrier, a first detecting element for generating a first primary position signal which is indicative for an amount of radiation reflected by the record carrier at said first spot, a second detection element for generating a second primary position signal which is indicative for an amount of radiation reflected by the record carrier at said second spot, a third detection element for generating a third primary position signal which is indicative for an amount of radiation reflected by the record carrier at said third spot, digitizing means for providing a digital version of each of the primary position signals, signal processing means for generating a plurality of secondary position signals in response to the digital version of the primary position signals, a selection element for selecting one of the position signals as an output signal in response to a selection signal, wherein, the selection signal is derived from the output signal of the selection element.

13. Device according to claim 12, characterized in that a plurality of secondary positions are obtained by adding a corresponding constant value to the primary position signals.

14. Device according to claim 12, characterized by a lookuptable that contains values used for deriving the selection signal from the output signal.

15. Device according to claim 12, characterized by computation means for deriving the selection signal (SEL) from the output signal (WRE).

16. Device according to claim 15, wherein the computation means derives the selection signal as a function of the value of the output signal.

17. Device according to claim 14, wherein the lookuptable contains a plurality of ranges for values used and for deriving the selection signal from the output signal.

18. Device according to claim 17, wherein the plurality of ranges for values does not contain any overlapping values.

19. Device according to claim 18, wherein the plurality of ranges for values forms a continuous range that does not have any gaps in values.

20. Device according to claim 13, wherein at least two of the secondary positions are obtained by adding the corresponding one of the plurality of constant values to at least one two of the primary position signals.

* * * * *